United States Patent [19]

Winner et al.

[11] Patent Number: 5,920,687
[45] Date of Patent: Jul. 6, 1999

[54] Z-BUFFER STORAGE BASED ON OPACITY AND DEPTH USING POINTERS

[75] Inventors: Stephanie L. Winner, Santa Clara; Michael W. Kelley, San Mateo, both of Calif.

[73] Assignee: Apple Computer, Inc., Cupertino, Calif.

[21] Appl. No.: 08/479,827

[22] Filed: Jun. 7, 1995

Related U.S. Application Data

[63] Continuation of application No. 08/060,299, May 10, 1993, abandoned.

[51] Int. Cl.$^6$ ................................................ G06T 17/20
[52] U.S. Cl. ............................................................ 395/122
[58] Field of Search ........................................ 395/122, 157, 395/121; 345/120, 139

[56] References Cited

U.S. PATENT DOCUMENTS

| | | | |
|---|---|---|---|
| 3,648,250 | 3/1972 | Low et al. | 345/20 |
| 4,475,104 | 10/1984 | Shen | 395/122 |
| 4,594,673 | 6/1986 | Holly | 395/121 |
| 4,658,247 | 4/1987 | Gharachorloo | 345/196 |
| 4,679,041 | 7/1987 | Fetter et al. | 345/139 |
| 4,697,178 | 9/1987 | Heckel | 395/122 |
| 4,815,009 | 3/1989 | Blatin | 395/129 |
| 4,866,637 | 9/1989 | Gonzalez-Lopez et al. | 395/126 |
| 4,885,703 | 12/1989 | Deering | 395/122 |

(List continued on next page.)

FOREIGN PATENT DOCUMENTS 527587 2/1993 European Pat. Off. .

OTHER PUBLICATIONS

Horowitz et al, Fundamentals of Data Structures in Pascal, 1984, pp. 30–39, 334–339.

Hayes, Computer Architecture & Organization, 1978, pp. 99–101.

Potmesil, The Pixel Machine, Computer Graphics, Jul. 1989, pp. 69–78.

Molnar, PixelFlow: High Speed Rendering Using Image Composition, Computer Graphics, Jul. 1992, pp. 231–240.

Madarasmi et al., Multi Layer Surface Segmentation using Energy Minimization, Computer Vision and Pattern Recongition, Jun. 15, 1993, pp. 774–775.

Mammen, Transparency and Antialiasing Algorithms Implemented with teh Virtual Pixel Maps Technique, Computer Graphics, Jul. 1989, pp. 43–55.

(List continued on next page.)

*Primary Examiner*—Anton W. Fetting
*Attorney, Agent, or Firm*—Blakely, Sokoloff, Taylor & Zafman

[57] ABSTRACT

A computer graphics system having a processor for generating objects for display, a multi-layered Z-buffer for storing data according to their relative depths, the processor also compositing the data stored in the Z-buffer, a frame buffer for storing composited data, a display for displaying an image as a number of pixels responsive to the composited data in the frame buffer, and two registers for facilitating the Z-buffering process is disclosed. One of the registers stores a number indicating how many of the layers in the Z-buffer contain visible data dependent on opacity of existing objects. In the other register, a number of addresses corresponding to each of the layers of the Z-buffer are stored. Each address specifies a location where data of one of the layers is stored. A determination is made as to which layer data associated with an incoming object is to be inserted. This determination depends on the contents of the first register as well as the value of the incoming object relative to those of objects already stored in the Z-buffer. The addresses of the second register are arranged to correspond to the appropriate layers in response to insertion of the incoming data.

21 Claims, 5 Drawing Sheets

U.S. PATENT DOCUMENTS

| | | | |
|---|---|---|---|
| 4,897,803 | 1/1990 | Calarco et al. | 395/166 |
| 4,945,500 | 7/1990 | Deering | 395/122 |
| 4,954,818 | 9/1990 | Nakane et al. | 345/120 |
| 4,970,499 | 11/1990 | Ryherd et al. | 395/122 |
| 4,970,636 | 11/1990 | Snodgrass et al. | 395/122 X |
| 4,977,518 | 12/1990 | Bonnet et al. | 395/133 |
| 5,001,651 | 3/1991 | Rehme et al. | 395/126 |
| 5,027,292 | 6/1991 | Rossignac et al. | 395/122 |
| 5,043,921 | 8/1991 | Gonzalez-Lopez et al. | 395/122 |
| 5,081,698 | 1/1992 | Kohn | 395/122 |
| 5,081,700 | 1/1992 | Crozier | 395/137 X |
| 5,101,365 | 3/1992 | Westberg et al. | 395/122 X |
| 5,115,402 | 5/1992 | Matsushiro et al. | 395/141 |
| 5,123,085 | 6/1992 | Wells et al. | 395/121 |
| 5,128,872 | 7/1992 | Malachowsky et al. | 395/162 |
| 5,157,388 | 10/1992 | Kohn | 345/136 |
| 5,159,663 | 10/1992 | Wake | 395/122 |
| 5,214,753 | 5/1993 | Lee et al. | 395/125 |
| 5,222,204 | 6/1993 | Swanson | 395/127 |
| 5,249,264 | 9/1993 | Matsumoto | 395/122 X |
| 5,253,335 | 10/1993 | Mochizuki et al. | 395/122 |
| 5,261,041 | 11/1993 | Susman | 395/152 |
| 5,268,995 | 12/1993 | Diefendorff et al. | 395/122 |
| 5,274,760 | 12/1993 | Schneider | 395/509 |
| 5,278,949 | 1/1994 | Thayer | 395/126 |
| 5,313,586 | 5/1994 | Rutman | 395/800 |
| 5,377,313 | 12/1994 | Scheibl | 395/122 |
| 5,394,523 | 2/1995 | Harris | 395/501 |
| 5,402,532 | 3/1995 | Epstein et al. | 395/122 |
| 5,428,716 | 6/1995 | Brokenshire et al. | 395/122 X |
| 5,490,238 | 2/1996 | Watkins | 395/122 |
| 5,497,453 | 3/1996 | Megahed et al. | 395/122 |

OTHER PUBLICATIONS

Saito et al., NC Machining with G–Buffer Method, Computer Graphics, Jul. 1991, pp. 207–216.

Watanabe et al., A Trigonal Prism–Based Method for Hair Image Generation, IEEE Computer Graphics and Applications, Jan. 1992, pp. 47–53.

Mammen, Transparency and Antialiasing Algorithms Implemented with Virtual Pixel Maps Technique, IEEE Computer Graphics & Applications, Jul. 1989, pp. 43–55.

Foley et al., Computer Graphics: Principles and Practice, 1990, pp. 882–883.

Horowitz et al., Fundamentals of Data Structures in Pascal, 1982, pp. 335–338.

Salesin, D. and Stolfi, J., "Rendering CSG Models with a ZZ-Buffer" in: *Computer Graphics*, vol. 24, No. 4, (Aug. 1990) pp. 67–76.

"Computer Graphics Principles and Practice Second Edition", by Foley, Van Dam, Feiner and Huges, Published by the Addision Wesley Publishing Corp., pp. 885–886 and pp. 899–900. Date–1990.

"Pyramidal Parametrics", by Lance Williams, Computer Graphics vol. 17 No. 3, Jul. 1983.

Oka, Masaaki, et al., "Real–Time Manipulation of Texture–Mapped Surfaces," Computer Graphics, vol. 21, No. 4, pp. 181–188 (Jul. 1987).

Deering, Michael, et al., "The Triangle Processor and Normal Vector Shader: A VLSI System for High Performance Graphics," Computer Graphics, vol. 22, No. 4, pp. 21–30 (Aug. 1988).

Kirk, David, et al., "TheRendering Architecture of the DN10000VS," Computer Graphics, vol. 24, No. 4 pp. 299–307 (Aug. 1990).

Fuchs, Henry, et al., "Pixel–Planes 5: A Heterogeneous Multiprocessor Graphics System Using Processor Enhanced–Memories," Computer Graphics, vol. 22, No. 4, pp. 239–246 (Aug. 1988).

Akeley, Kurt, et al., "High–Performance Polygon Rendering," Computer Graphics, vol. 22, No. 4, pp. 239–246 (Aug. 1988).

|  | ActiveLayers | Example 1<br>incoming object | Layer0 Layer1 ••• Layer8 |
|---|---|---|---|
| before | 0 |  |  |
| after | 1 | ■ ⌐301 | ■ ╲301 |

|  | ActiveLayers | Example 2<br>incoming object | Layer0 Layer1 ••• Layer8 |
|---|---|---|---|
| before | 1 |  | ■╲301 |
| after | 1 | ■⌐302 | ■╲302 |

|  | ActiveLayers | Example 3<br>incoming object | Layer0 Layer1 ••• Layer8 |
|---|---|---|---|
| before | 1 |  | ■╲301 |
| after | 1 | ■⌐302 | ■╲301 |

|  | ActiveLayers | Example 4<br>incoming object | Layer0 Layer1 ••• Layer8 |
|---|---|---|---|
| before | 1 |  | ■╲301 |
| after | 2 | ▨⌐303 | ▨╲301  ■⌐301 ╲303 |

|  | ActiveLayers | Example 5<br>incoming object | Layer0 Layer1 ••• Layer8 |
|---|---|---|---|
| before | 1 |  | ■╲301 |
| after | 1 | ▨⌐303 | ■╲301 |

|  | ActiveLayers | Example 6<br>incoming object | Layer0 Layer1 ••• Layer8 |
|---|---|---|---|
| before | 1 |  | ▨╲304 |
| after | 1 | ■⌐305 | ■╲305 |

|  | ActiveLayers | Example 7<br>incoming object | Layer0 Layer1 ••• Layer8 |
|---|---|---|---|
| before | 1 |  | ▨╲304 |
| after | 2 | ■⌐305 | ▨╲304  ■⌐305 ╲304 |

|  | ActiveLayers | Example 8<br>incoming object | Layer0 Layer1 ••• Layer8 |
|---|---|---|---|
| before | 1 |  | ▨╲304 |
| after | 2 | ▨⌐306 | ▨╲304  ▨⌐305 ╲306 |

|  | ActiveLayers | Example 9<br>incoming object | Layer0 Layer1 ••• Layer8 |
|---|---|---|---|
| before | 1 |  | ▨╲304 |
| after | 2 | ▨⌐306 | ▨╲304  ▨⌐306 ╲304 |

FIG. 4

| Inputs | | | | Outputs | | |
|---|---|---|---|---|---|---|
| Active Layers | incoming object | Insert Pointer | Z-buffer RAM write | Active Layers | Insert Layer | LayerPointer |
| 0 | 401, Z=15 | | | 0 | | 7,6,5,4,3,2,1,0 |
| 1 | 402, Z=10 | 0 | <0>= 401, Z=15 | 1 | 0 | 0,7,6,5,4,3,2,1 |
| 1 | 403, Z=8 | 1 | <1>= 402, Z=10 | 1 | 0 | 1,0,7,6,5,4,3,2 |
| 2 | 404, Z=9 | 2 | <2>= 403, Z=8 | 2 | 0 | 2,1,0,7,6,5,4,3 |
| 3 | 405, Z=11 | 3 | <3>= 404, Z=9 | 3 | 1 | 2,3,1,0,7,6,5,4 |
| 3 | 406, Z=5 | 4 | no write | 3 | none | 2,3,1,0,7,6,5,4 |
| | | 4 | <4>= 406, Z=5 | 1 | 0 | 4,2,3,1,0,7,6,5 |

Z-BUFFER STORAGE BASED ON OPACITY AND DEPTH USING POINTERS

This is a continuation of application Ser. No. 08/060,299, filed May 10, 1993, abandoned.

FIELD OF THE INVENTION

The present invention pertains to the field of computer graphics display systems. More particularly, the present invention relates to an apparatus and method for a high performance multiple layer Z-buffer in a computer graphics display system.

BACKGROUND OF THE INVENTION

One area in which computer systems are finding increased application is in that of the graphical arts. Technological advances in the speed, processing power, and memory of computers coupled with lower costs have made them ideally suited for use in graphical display systems. Computer generated displays enable users to visualize two and three dimensional objects. Users can group the information content of a graphical display much more effectively than if the same information were to be presented in other formats. A picture is worth a thousand words.

Furthermore, computer graphics also provide a natural and fluid interaction between the computer and a user. Changes to a display are input to the computer which then effectuates those desired changes by modifying the display accordingly. This process provides a convenient vehicle for modeling, predicting, and experimenting with various events. And with the development of high resolution display screens, increasingly complex geometric objects can be rendered with greater precision and clarity. Some examples of computer graphics applications include flight simulators for training pilots, computer aided design for aiding engineers and architects, diagnostic medical scanners for doctors, animated pictures in movies and video games, etc.

Basically, a computer graphics system can be broken into three components: a frame buffer, a monitor, and a display controller. The frame buffer is a digital memory for storing the image to be displayed as a series of binary values. The monitor is comprised of a screen having an array of picture elements, known as pixels. Each pixel represents a dot on the screen and can be programmed to a particular color or intensity. Thousands of individual pixels so programmed are used to represent a displayed image. It is these individual pixel values which are stored in the frame buffer. A display controller is an interface used for passing the contents of the frame buffer to the monitor. The display controller reads the data from the display buffer and converts it into a video signal. The video signal is fed to the monitor which displays the image.

Images are repeatedly rendered into the display over and over again, with each new frame representing a new position or shape of the image to be viewed. The image must be repeatedly sent to the monitor in order to maintain a steady picture on the screen. Due to the retentiveness of the human eye, the monitor needs to be refreshed at a minimum of 30 times a second. Otherwise, the display will flicker in a very annoying and distracting manner. In today's computer graphics systems, the refresh frequency is typically around 72 hertz (i.e., 72 times a second). A faster refresh rate produces less flicker. Hence, the duration for displaying an image is relatively small, approximately 1/72 of a second or 14 milliseconds. Given these restraints, it is imperative to speed up the graphics drawing process to avoid sluggish response times and jerky movements of displayed images. Moreover, the faster an image can be drawn, the more information which can be provided to the display. This results in smoother, more dynamic, and crisper images.

Typically, a three-dimensional graphics rendering device that renders images into the frame buffer also stores additional information per pixel (e.g., Alpha, Z, etc.), which is not required by the frame buffer itself. Alpha values represent a blending function. Z values represent a pixel's distance from the viewer. Typically, small Z values indicate that the object is close to the observer, whereas large Z values indicate that the object is further away. This additional Z storage per pixel is typically referred to as a Z-buffer.

By implementing a Z-buffer, usually in the form of DRAMs, Z values can be stored. The Z-buffer contains distance information which is used in indicating whether one object is displayed in front of or behind another object. In most conventional Z-buffers, a Z-sort operation is performed by comparing the Z value of incoming data with the Z value of pre-existing data. If the incoming data is closer (i.e., it has a smaller Z value), the incoming color data replaces the pre-existing data in the frame buffer, and the old Z value is replaced by the new Z value. Otherwise, the incoming data is discarded. When there is no more incoming data, the Z-sort is complete, and the contents of each frame buffer/Z-buffer location represents the final color/intensity for that particular pixel.

The Z-sort operation is rather straightforward if all of the objects represented by the data are opaque. However, if the object in the buffer is not opaque, it is necessary to retain information about the data which is discarded in order to determine the final color intensity of a pixel. To avoid the loss of the data, many Z-buffer systems require that all of the non-opaque data be rendered after all opaque data has been rendered and that the non-opaque data be rendered in Z sorted order (e.g., closest to furthest). Any non-opaque objects which are behind the opaque object in the buffer are discarded. The remaining non-opaque objects are composited with the data in the frame buffer and the result is stored in the frame buffer so that no requisite information is lost. Since the compositing operation must be performed in a specific Z order, the non-opaque objects must be arranged by Z-depth (i.e., either closest to furthest or furthest to closest) before being compared with the Z value of the data in the buffer.

Unfortunately, this method of rendering non-opaque objects has a number of shortcomings. Sorting the non-opaque objects by Z value is computationally expensive. Also, this method does not render interpenetrating non-opaque objects correctly; these must be explicitly tested for, and specially processed, further increasing computation. Consequently, performing the Z sort process reduces the amount of time left to actually draw the images which detrimentally impacts the overall display process.

Other systems have been proposed to solve the problem of rendering non-opaque objects which avoid these shortcomings. These systems usually store more than one Z and color value per pixel, allowing some number of the closest non-opaque objects to be saved, and then composited later. However, these systems require a greatly increased number of Z-buffer RAM accesses necessary to maintain and sort the multiple Z values per pixel. This increases the bandwidth requirements of the Z-buffer memory, reducing performance and/or increasing cost. However, an advantage of this method is that it defers compositing until after the per pixel Z sort is complete, which improves performance by avoiding unneccessary compositing of objects which are later obscured by a closer object.

Therefore, there is a need in prior art computer graphics systems for an apparatus or method which is capable of minimizing the time required to perform Z operations. It would be preferrable if such an apparatus or method could defer compositing until after Z sort is completed without losing the data necessary for compositing non-opaque objects. It would also be highly preferable if such a mechanism could minimize the number of DRAM accesses.

SUMMARY AND OBJECTS OF THE INVENTION

The present invention can be applied to computer graphics systems. A multiple layer Z-buffer containing Z values for each of the pixels is controlled according to the values in two registers which are instanced for each pixel. One register, referred to as the ActiveLayers register, contains a value indicating how many of the layers are occupied with potentially visible object data. The other register, referred to as the LayerPointer register, contains pointer values indicating the memory location to which the data for each layer is stored.

After one frame has completely rendered, the ActiveLayers register is initialized to 0. The first incoming object increments the ActiveLayers register. If a subsequent incoming object falls behind an opaque object it is discarded, regardless of whether it is opaque or not. If the subsequent incoming object is opaque (and is not hidden), the ActiveLayers register is decremented once for each pre-existing object which becomes hidden behind the incoming opaque object. The ActiveLayers register is then incremented to reflect the incoming opaque object. Otherwise, if a subsequent incoming object is non-opaque (and is not hidden), the ActiveLayers register is incremented.

The LayerPointer register contains a number of pointers equal to the number of layers being implemented. Each pointer specifies a unique address. If an incoming object is hidden behind a pre-existing opaque object, the incoming object is discarded, and the LayerPointer register remains unchanged. Otherwise, the layer wherein the incoming object should be inserted is determined. This determination is based on the incoming object's Z values relative to those Z values already existing in the buffer. The opacity of the incoming object affects the ActiveLayers register. The data of the incoming object is written to the address specified by a pointer. The pointers are then adjusted accordingly.

In the currently preferred embodiment, the incoming data is written to the address specified by the pointer corresponding to the last layer. The InsertLayer for the incoming data is determined. The pointer from the last layer is inserted in the InsertLayer. All the pointers of those layers following that of the InsertLayer is shifted one place to the right. The pointers to the left of the InsertLayer remains unchanged. Manipulating the values in the ActiveLayers and LayerPointer registers optimizes the Z-buffering process.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A high performance multiple layer Z-buffer in a computer graphics system is described. In the following description, for the purpose of explanation, numerous specific details such as registers, bit lengths, number of layers, etc., are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
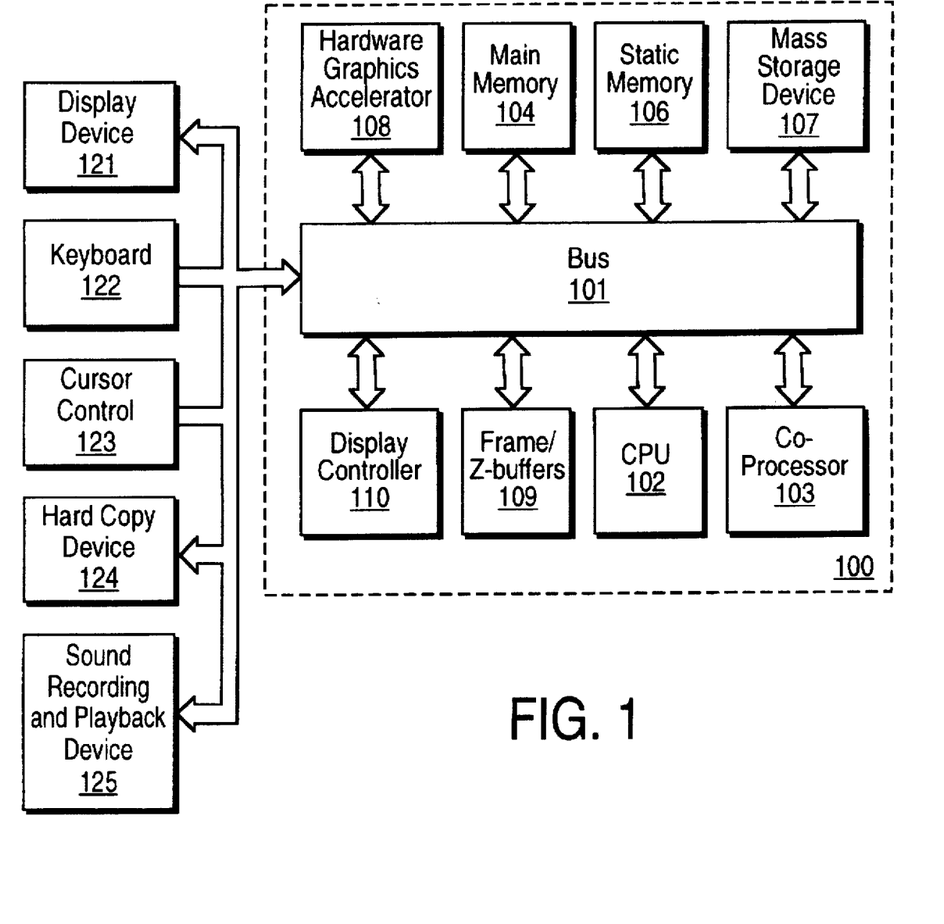
FIG. 1 illustrates a computer system upon which the preferred embodiment of the present invention can be implemented.

Referring to FIG. 1, a computer system upon which the preferred embodiment of the present invention can be implemented is shown as 100. Computer system 100 comprises a bus 101 for the internal transmission of digital data. A central processing unit 102 for processing digital data is coupled with bus 101 for processing information. Furthermore, a number of co-processors 103 can be coupled onto bus 101 for additional processing power and speed.

Computer system 100 further comprises a random access memory (RAM) 104 (referred to as main memory) which is also coupled to bus 101. Main memory 104 is used in storing information and instructions which are executed by processor 102. Main memory 104 also may be used for storing temporary variables or other intermediate information during execution of instructions by CPU 102. Computer system 100 also comprises a read only memory (ROM) or some other type of static storage device 106. ROM 106 is coupled to bus 101 and is used to store static information and instructions for processor 102. A data storage device 107 (e.g., a hard disk drive, floppy disk drive, etc.) drive can be coupled to bus 101 for storing information and instructions.

Also coupled to bus 101 is hardware graphics accelerator 108, frame/Z-buffers 109, and display controller 110. Hardware graphics accelerator 108 is designed to accelerate interactive 3D graphics software extensions. It comprises an ASIC, a static RAM cache, and texture mapping RAM. Accelerator 108 outputs a high bandwidth pixel stream to frame/Z-buffer 109. Simultaneously, the host CPU 102 generates the signal containing the primitives which are input to and rendered by accelerator 108. Display controller 110 interfaces computer system 100 to a display device 121.

One example of a display device 121 is a cathode ray tube (CRT) used for displaying information to a computer user. An alphanumeric input device 122, such as a keyboard, may also be coupled to bus 101, as well as a cursor control device 123. A cursor control device 123 is used for controlling cursor movement on display device 121. This input device typically has two degrees of freedom in two axes, a first axis (e.g., x) and a second axis (e.g., y) which allows the device to specify any position in a plane. In the present invention, a three-dimensional cursor having a third degree of freedom in a Z-axis is utilized. Some examples of a cursor control device 123 include a mouse, joystick, trackball, touch pad, etc.

The present invention can be applied equally to conventional screen Z-buffering as well as scanline Z-buffering techniques. In screen Z-buffering, the state information necessary for rendering a pixel is stored for every pixel on the screen. Each object to be rendered is transformed and rasterized independently. Conventional screen Z-buffering techniques often involve very high bandwidths plus large quantities of fast memory and are often coupled with sophisticated caching and prefetching mechanisms. In comparison, scanline Z-buffering presorts the object database in screen space and renders each scanline individually. One scanline of pixel state information is kept.

Figure 2:
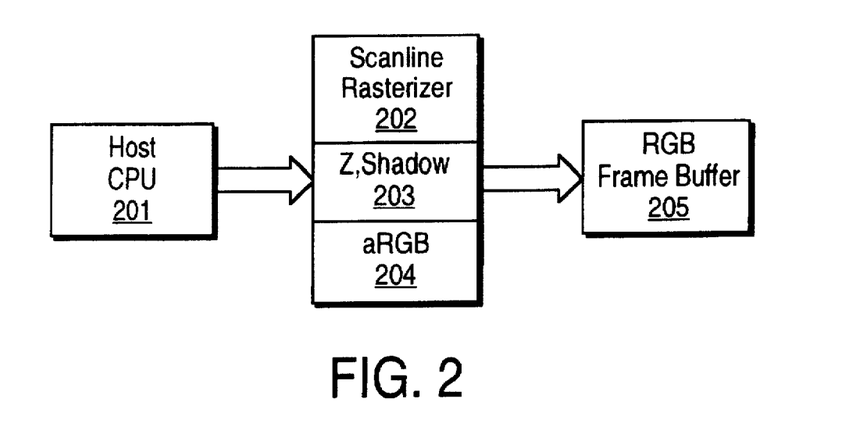
FIG. 2 is a block diagram showing a graphics system utilizing scanline Z-buffering.

FIG. 2 is a block diagram showing a graphics system utilizing scanline Z-buffering. The host CPU 201 is used for transformation, shading, and active list maintenance. Scanline rasterizer 202 performs shading and hidden surface removal via a Z-buffer 203, shadow volumes, and alpha blending 204. The rasterizer 202 intersects polygons transferred from the active polygon list with the scanline and generates a series of horizontal spans. The resulting spans are rasterized. Furthermore, hidden surface removal, shadow plane tests, and alpha blending are performed. Rendering begins when the CPU 201 traverses the 3D database and generates transformed, projected, clipped, and shaded polygons. The polygons are bucket sorted by the number of the first scanline on which they first become active. Once the main database traversal is complete, the host traverses the bucket sorted list in screen Y order, maintaining an active polygon list which is transferred into the rasterizer 202 for rendering into RGB frame buffer 205.

Z values are represented as a floating point number with a 23-bit fractional normalized mantissa and an 8-bit exponent. There is also a one bit tag which is asserted if the object is frontfacing. If during the comparison the two Z values are equal, it is necessary to determine if incoming object is frontfacing. There is a flag in the object data which is designed for this purpose. If the incoming object is frontfacing it is considered to be in front of the object which is in the buffer. In the present invention, the Z-buffer is comprised of multiple layers and multiple pixels for handling opaque as well as non-opaque objects. Although any number of layers and pixels can be implemented with the present invention, eight layers and eight pixels are utilized in the currently preferred embodiment.

The Z value of incoming data for a particular pixel is compared with each layer in the buffer until it is determined where or whether it should be placed in the buffer. There are two registers, an ActiveLayers register and a LayerPointer register associated with each pixel for optimizing the sorting process. The ActiveLayers register indicates how many of the layers are occupied with potentially visible object data. Because non-opaque objects are supported, it is not known whether an object is visible until after the compositing operation is completed. The LayerPointer register indicates in which memory location the data for each layer is to be stored.

The operation of these two registers are now described in detail. The ActiveLayers register is first initialized to zero. When the first object is received it is written into the layer of the Z-buffer as indicated by the ActiveLayers register. Since the ActiveLayers register had been initialized to zero, the first object is thereby written to Layer 0, the ActiveLayers register is incremented by one. When a successive incoming object is received its value is compared with the Z value of the object in layer 0. The opacity of the incoming object only affects the ActiveLayers register and not the LayerPointer register nor the Z-buffer. Whether the incoming object is written is determined by the opacity of objects in the buffer and overflow. Its write location is determined by the relative Z values.

Figure 3:
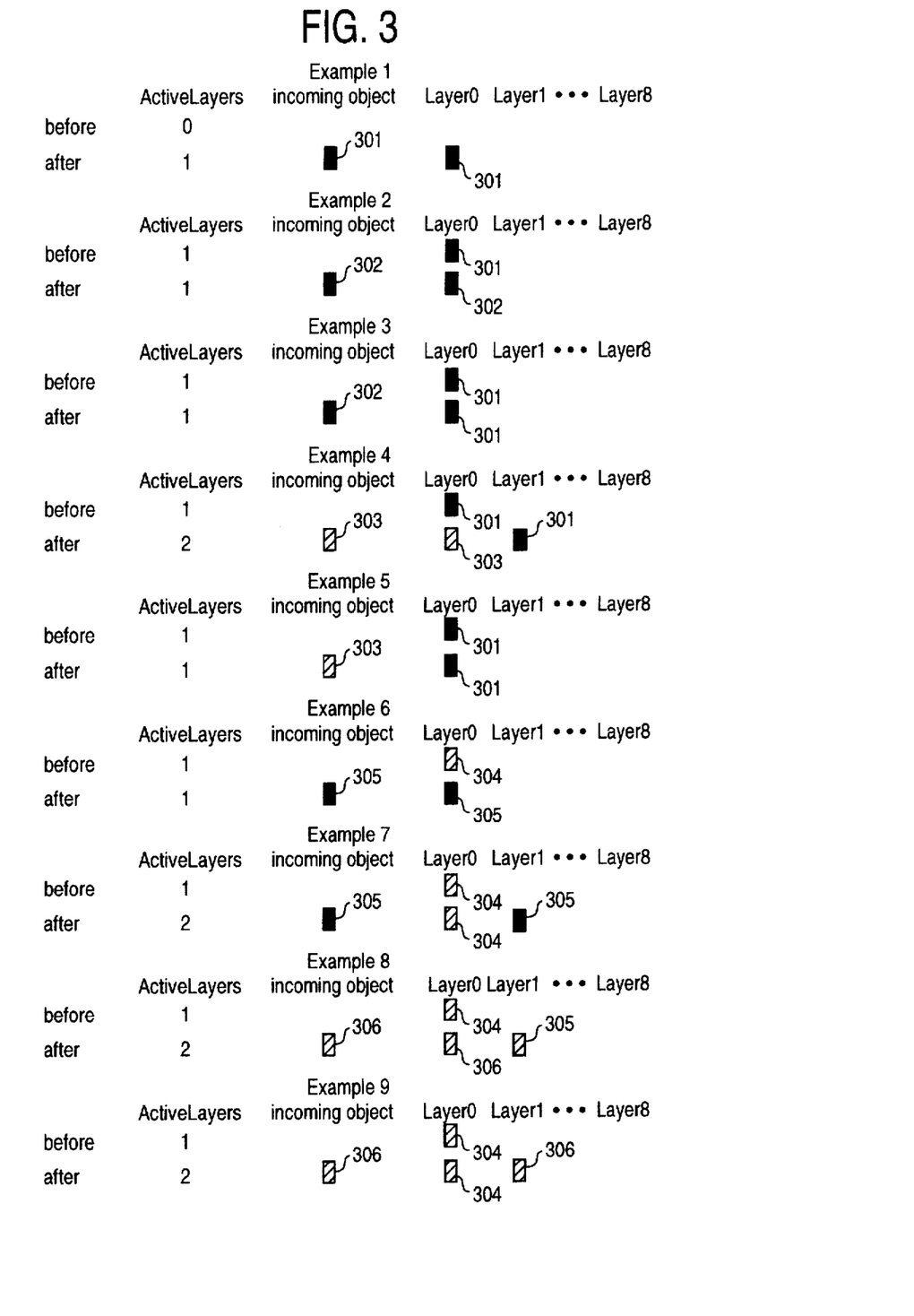
FIG. 3 shows the various different combinations of how incoming opaque and non-opaque objects are handled.

FIG. 3 shows the various different combinations of how incoming opaque and non-opaque objects are handled. Examples of each possible combination are given illustrating how the objects are assigned to the different layers along with the corresponding changes made to the ActiveLayers register. In example 1, the ActiveLayers register is initialized to a value of zero after completion of rendering. Whenever an incoming object 301 is received, it is written into the layer designated by the ActiveLayers register. In example 1, the first object is opaque and is written into layer 0. The ActiveLayer register is then incremented by one (i.e., incremented from 0 to 1). In example 2, a second incoming object 302 is received. Object 302 is opaque and has a smaller Z value than object 301 (i.e., object 302 is closer to the viewport than object 301). The incoming data corresponding to object 302 is written to layer 0. The contents of the ActiveLayers register remains unchanged (i.e., it remains set at 1). Note that the data corresponding to object 301 has been effectively overwritten. It still exists in the Z-buffer RAM; only the LayerPointer register changes. Hence, if the incoming object falls behind a pre-existing opaque object, the incoming object is "hidden" behind the opaque object and can thereby be discarded.

Example 3 illustrates the events occurring if the second incoming object 302 has a greater Z value than object 301 which resides in layer 0. Since object 302 is "hidden" behind opaque object 301, its incoming value can be safely discarded. Everything else remains the same. In example 4, the incoming object 303 is non-opaque and has a smaller Z value. Hence, the data corresponding to object 301 is moved so as to correspond to layer 1, and the incoming data is written to layer 0. The ActiveLayers register is incremented to 2. In example 5, the incoming non-opaque object has a larger Z value. Consequently, its incoming data is discarded.

Referring to examples 6–9, the pre-existing object 304 is non-opaque. In example 6, an incoming object 305 is opaque and has a smaller Z value. Hence, the incoming data is written to layer 0 and the data associated with object 304 is discarded. If the incoming opaque object 305 has a larger Z value, its data corresponds to layer 1; the ActiveLayers register is incremented to 2; and the data corresponding to object 304 remains stored in layer 1, depicted in example 7.

Example 8 illustrates the events which occur when the incoming object is non-opaque and has a smaller Z value. Under such circumstances, the data corresponding to pre-existing object 304 is moved to layer 1; the incoming data is written to layer 0, and the ActiveLayers register is incremented by one to 2. In example 9, the incoming non-opaque object 306 has a larger Z value. Consequently, the incoming data is changed to correspond to layer 1 and the ActiveLayers register is incremented to 2. Table 1 below lists the eight different possible scenarios associated with an incoming object.

TABLE 1

| Pre-existing Object$_1$ in Layer 0 | Incoming Object$_2$ | Z Value of Incoming Object | Layer 0 | Layer 1 | ActiveLayers Register |
|---|---|---|---|---|---|
| Opaque | Opaque | Smaller | Object$_2$ | — | 1 |
| Opaque | Opaque | Larger | Object$_1$ | — | 1 |
| Opaque | Non-opaque | Smaller | Object$_2$ | Object$_1$ | 2 |
| Opaque | Non-opaque | Larger | Object$_1$ | — | 1 |
| Non-opaque | Opaque | Smaller | Object$_2$ | — | 1 |
| Non-opaque | Opaque | Larger | Object$_1$ | Object$_2$ | 2 |
| Non-opaque | Non-opaque | Smaller | Object$_2$ | Object$_1$ | 2 |
| Non-opaque | Non-opaque | Larger | Object$_1$ | Object$_2$ | 2 |

By implementing an ActiveLayers register, only those layers which contain potentially visible objects are compared during the sort operation. Note that without using an ActiveLayers register or its equivalent, incoming data would be required to be checked against all eight layers. Reading and writing the object data is costly in terms of speed since it requires accessing the Z-buffer DRAM. Note that typical prior art Z-buffers only have one layer, two at the most, so only one or two reads are required to complete the sort operation. Multiple layers complicate the Z-sort operation, but are necessary to defer the compositing operation and to eliminate the need for ordering the non-opaque data.

The ActiveLayers register also simplifies the removal of obstructed objects from the Z-buffer. If any object falls behind an opaque object, it must be removed from the buffer which requires that the RAM be written. Instead of writing the RAM, the value in the ActiveLayers register is adjusted to reflect the new condition.

Furthermore, an ActiveLayers register saves time by eliminating the need to initialize each of the eight layers to the maximum Z value (i.e., infinity). Rather, after each frame has been completely rendered, the ActiveLayers register is reset to zero. In typical prior art Z-buffers, all of the Z values would have to be written to the maximum value and to a transparent object data.

In addition to the ActiveLayers register, a second, LayerPointer register, is implemented to minimize Z-buffer DRAM accesses. The LayerPointer register contains a number of pointers equal to the number of layers being utilized. In the currently preferred embodiment, eight 3-bit pointers are utilized. A pointer specifies a unique address of an object's data corresponding to each of the eight layers. The first pointer corresponds to layer 0. The second pointer corresponds to layer 1. Each successive pointer corresponds to each successive layer, up to layer 7.

By utilizing these pointers in the LayerPointer register, the movement of an object from one layer to another can essentially be simulated without actually reading from and writing to the Z-buffer. The present invention does not require reading the data of the pre-existing object, writing it into another layer, and then writing the incoming object's data into the first layer. Instead, the present invention accomplishes the same result by manipulating pointer values. In the currently preferred embodiment, the lowest pointer (i.e., the one corresponding to layer 7) is used to specify the address of an incoming object being written into the Z-buffer. In other words, the incoming data is written to the address specified by the pointer corresponding to layer 7.

Figure 4:
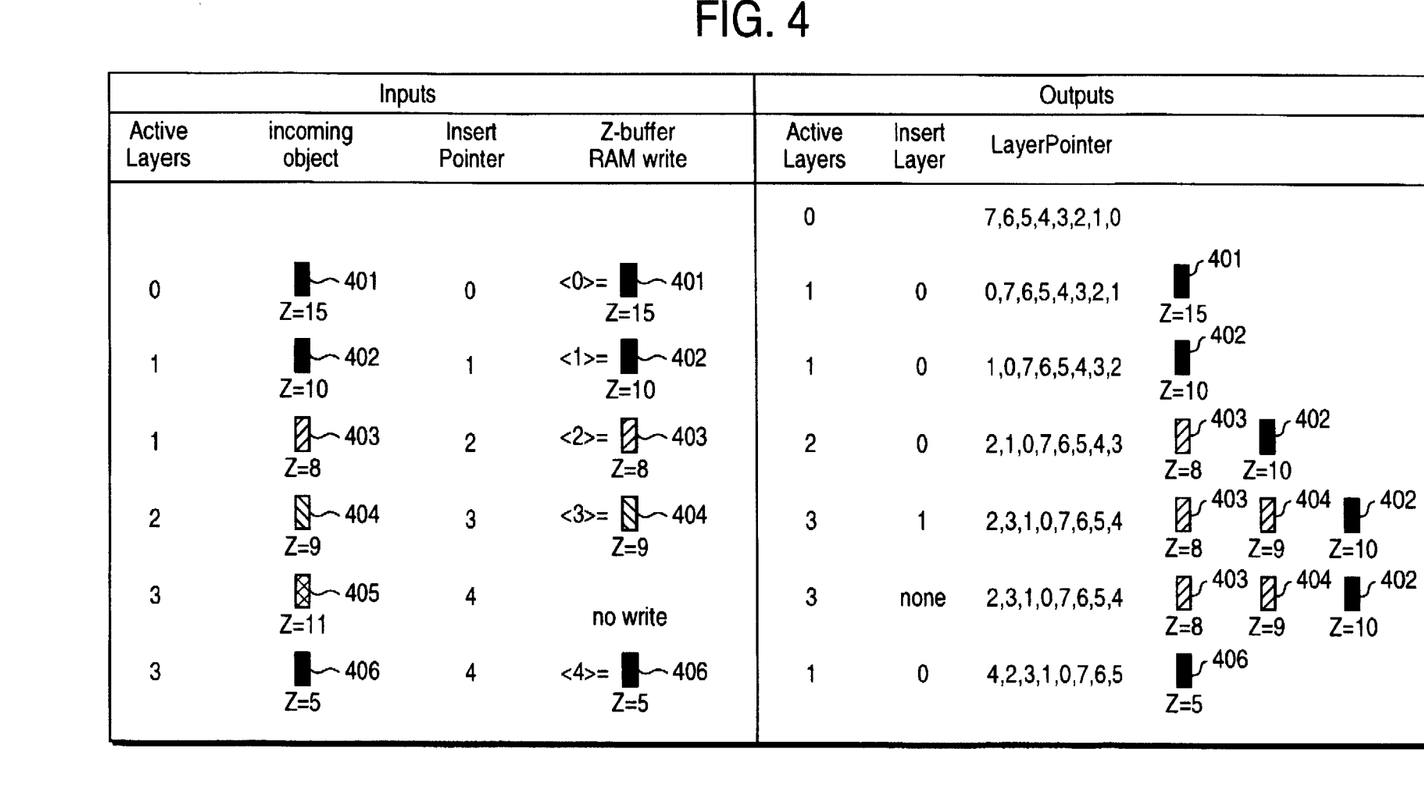
FIG. 4 shows an example of how the ActiveLayers and LayerPointer registers of the present invention operate for six consecutive incoming objects.

FIG. 4 shows an example of how the ActiveLayers and LayerPointer registers of the present invention operate for six consecutive incoming objects. Once the rendering of a frame has been completed, the ActiveLayers register is initialized to 0 and the LayerPointer register is set so that each pointer specifies a unique address. Note that the pointers need not be specified in any sequential order, but each pointer must specify a unique address. In the example, the eight 3-bit pointers are initialized to the following addresses: 7, 6, 5, 4, 3, 1, and 0 corresponding to layers 0–7, respectively.

The first incoming object 401 is opaque and has a Z value of 15. The pointer corresponding to layer 7 specifies an address of 0. Since it is the first object, the data should be inserted in layer 0. The ActiveLayers register is incremented. A barrel shift-right by one place is performed on layers 0–7 of the LayerPointer register. Hence, the ActiveLayers register becomes 1, and the contents of the LayerPointer register becomes 0, 7, 6, 5, 4, 3, 2, and 1. Note that the incoming data stored in address 0 now appropriately resides in layer 0.

A second incoming object 402 is opaque and has a Z value of 10. Its data is written to the address specified by the pointer of layer 7. In this case, the data is written to address 1. The Z values of object 402 is compared with that of object 401. Since object 402 is opaque and has a smaller Z value than object 401, object 401 is hidden behind object 402. Consequently, the incoming data should be inserted in layer 0. The ActiveLayers register remains unchanged. A barrel shift-right is performed on layers 0–7 of the LayerPointer register, such that it becomes 1, 0, 7, 6, 5, 4, 3, and 2. Note that the pointer of layer 0 correctly specifies the address containing the data of object 402. Note also that the data of object 401 still resides in address 0, but since the ActiveLayers register only specifies one layer, this data is rendered meaningless.

The third incoming object 403 is non-opaque and has a Z value of 8. The data of object 403 is written to address 2, as specified by the pointer of layer 7. Object 403 is in front of object 402 because its Z value of 8 is less than the Z value of 10 for object 402. Consequently, the incoming data should be inserted in layer 0. Since object 403 is non-opaque, the data corresponding to object 402 must still be maintained. Thus, ActiveLayers register is incremented. A barrel shift-right operation is performed for layers 0–7 of the PointerLayer register. The LayerPointer register now reads 2, 1, 0, 7, 6, 5, 4, and 3. The result is that the ActiveLayers register specifies two layers (i.e., layers 0 and 1). The pointer in layer 0 correctly specifies address 2, which contains the data for object 403, and the pointer in layer 1 specifies an address of 1, which contains the data for object 402.

A fourth incoming object 404 is non-opaque and has a Z value of 9. The pointer of layer 7 specifies an address of 3. The incoming data is written to that address. Since the Z value of object 403<Z value of object 404<Z value of object 402, the data of object 404 should be inserted in layer 1, in-between objects 403 and 402. The data of object 402 should be altered to correspond to layer 2 while that of object 403 should remain layer 0. This is effectuated by performing a barrel shift-right operation only for levels 1–7. The resulting contents of the LayerPointer register is 2, 3, 1, 0, 7, 6, 5, and 4. The ActiveLayers register is incremented. Thus, the pointers of the first three layers specify addresses 2, 3, and 1 which respectively correspond to that of objects 403, 404, and 402.

The fifth incoming object 405 is non-opaque and has a Z value of 11. Since it falls behind the opaque object 402, the incoming data is discarded. No changes are made to either the ActiveLayers or LayerPointer register.

The sixth incoming object 406 is opaque and has a Z value of 5. Object 406 falls in front of and hides all the pre-existing objects 402–404. The incoming data is written to address 4 and is inserted to layer 0. A barrel shift-right is performed for layers 0–7 of the LayerPointer register, so that it reads 4, 2, 3, 1, 0, 7, 6, and 5. Furthermore, the ActiveLayers register is reset to 1. It should be pointed out that modifying the ActiveLayers and LayerPointer registers is much quicker than accessing the DRAM to write the maximum Z value and the transparent alpha value as the registers occupy far fewer bits.

In one embodiment, the incoming object is checked to determine whether it falls behind the backmost object of the Z-buffer. If it falls behind the backmost object and that object is opaque, the incoming data is discarded. If the backmost object is not opaque, the incoming data is placed behind it, and the ActiveLayers and LayerPointer registers are modified accordingly. In this embodiment, only one comparison is needed to determine whether the incoming data should be discarded.

Figure 5:
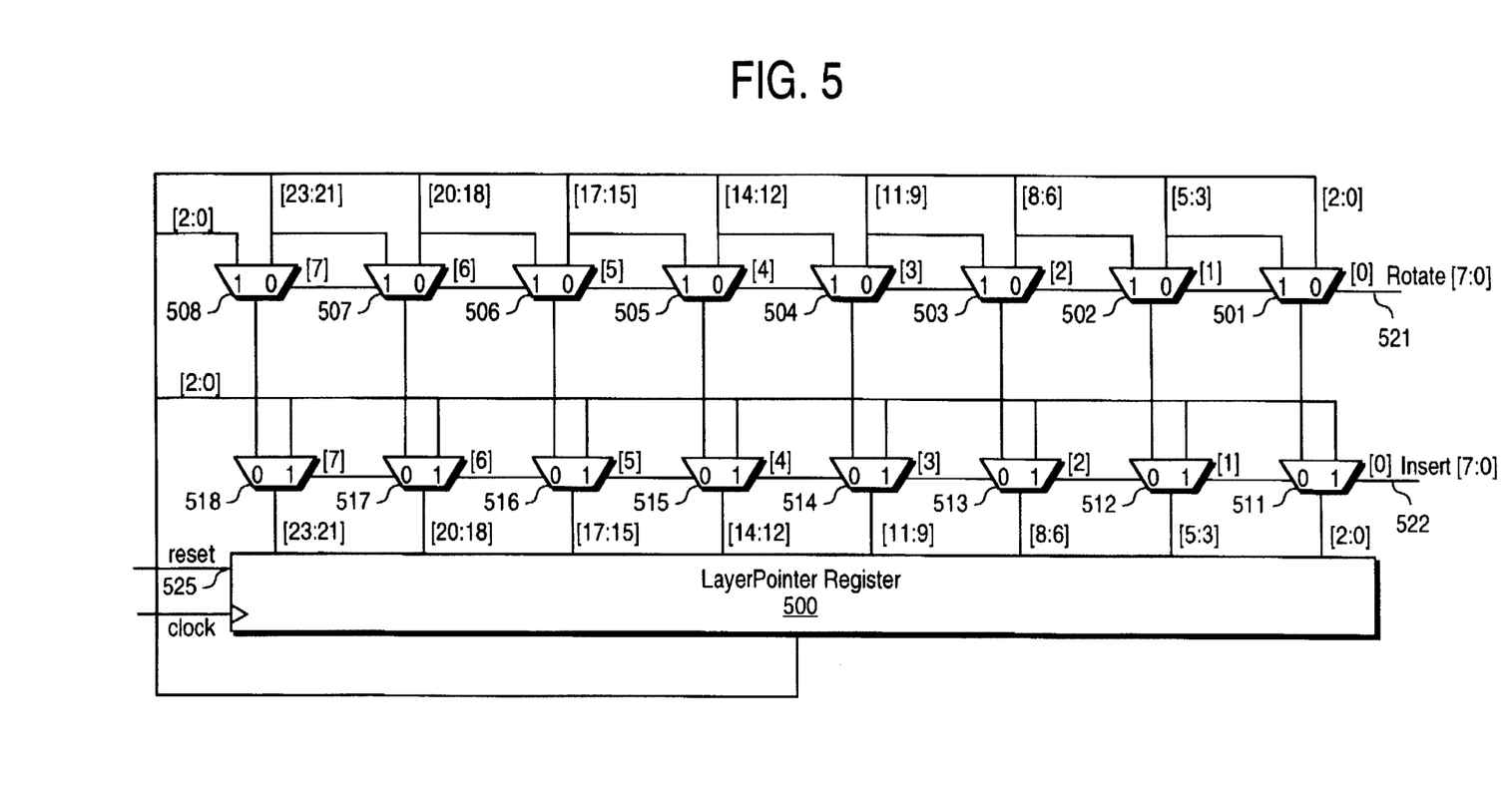
FIG. 5 is a circuit diagram illustrating one mechanism for maintaining the LayerPointer register.

FIG. 5 is a circuit diagram illustrating one mechanism for maintaining the LayerPointer register 500. Once the layer wherein an incoming object's data is to be inserted (i.e., the InsertLayer) is determined, the Rotate and Insert signals are generated according to Table 2 below.

TABLE 2

| Insert Layer | Rotate | Insert |
| --- | --- | --- |
| 0 | 0 × 7F | 0 × 80 |
| 1 | 0 × 3F | 0 × 40 |
| 2 | 0 × 1F | 0 × 20 |
| 3 | 0 × 0F | 0 × 10 |
| 4 | 0 × 07 | 0 × 08 |
| 5 | 0 × 03 | 0 × 04 |
| 6 | 0 × 01 | 0 × 02 |
| 7 | 0 × 00 | 0 × 01 |

The upper multiplexers 501–508 are used to rotate the pointers, especially for those situations wherein the incoming object is placed in front of other pre-existing objects in the Z-buffer. The rotate operation is performed by a barrel shift-right. The barrel shift-right is executed according to the 8-bit digital Rotate signal on line 521. Each of the eight bits controls each of the eight multiplexers 501–508. In other words, control bit 0 of the Rotate signal controls multiplexer 501; bit 1 controls multiplexer 502; etc. The control bit selects which of the two inputs to a multiplexer is to be output. Note that LayerPointer register 500 has eight layers and three bits per layer, for a total of 24 bits. Each multiplexer has two 3-bit inputs supplied by the LayerPointer register. If the control bit is a 0, the three bits corresponding to a particular pointer is selected for output on line 523. Conversely, if the control bit is a 1, the three successive next significant bits are selected for output on line 524. For example, if control bit 0 is a 0, bits 0–2 of the LayerPointer register 500, is selected for output by multiplexer 501. If control bit 0 happens to be a 1, bits 3–5 are selected for output by multiplexer 501.

The lower multiplexers 511–518 are used to move the pointer associated with layer 7 prior to receipt of incoming data, to the layer which the incoming object data is to be inserted. The insert operation is performed according to the 8-bit digital Insert signal on line 522. Each of the eight control bits of the Insert signal controls one of the eight multiplexers 511–518. A control bit selects for output one of the two input signals to a multiplexer. One input signal is a 3-bit output from one of the upper multiplexers. The other input signal is the three least significant bits of the LayerPointer register 500 (i.e., bits 0–2 which correspond to the pointer of layer 7). For example, if control bit 0 of the Insert signal is a 0, multiplexer 511 selects the 3-bit output from multiplexer 501 for output on line 524. If control bit 0 were a 1, multiplexer 511 selects bits 0–2 of the LayerPointer register 500 for output on line 524.

The operation of this LayerPointer circuit is now described in reference to the incoming objects depicted in FIG. 4 and described above. A reset signal on line 525 initializes the LayerPointer register 500 to a value of 7, 6, 5, 4,3,2, 1, and 0=111110101100011010001000. When data corresponding to object 401 is received, its InsertLayer is determined to be 0. Consulting Table 2, an InsertLayer of 0 translates into a Rotate signal of 0×7F=01111111, and the Insert signal is 0×80=10000000. According to the Rotate signal, multiplexer 501 selects bits 3–5 for output; multiplexer 502 selects bits 6–8; multiplexer 503 selects bits 9–11; multiplexer 504 selects bits 12–14; multiplexer 505 selects bits 15–17; multiplexer 506 selects bits 18–20; multiplexer 507 selects bits 21–23; and multiplexer 508 selects bits 21–23. And according to the Insert signal, multiplexers 511–517 select the outputs of multiplexers 501–507 respectively; multiplexer 518 selects bits 0–2 for output. The result is that the pointers for layers 0–6 are shifted to the right. The pointer corresponding to layer 7 is inserted into layer 0. The resulting contents of the LayerPointer register is 000111110101100011010001=0, 7, 6, 5, 4, 3, 2, 1.

Figure 6:
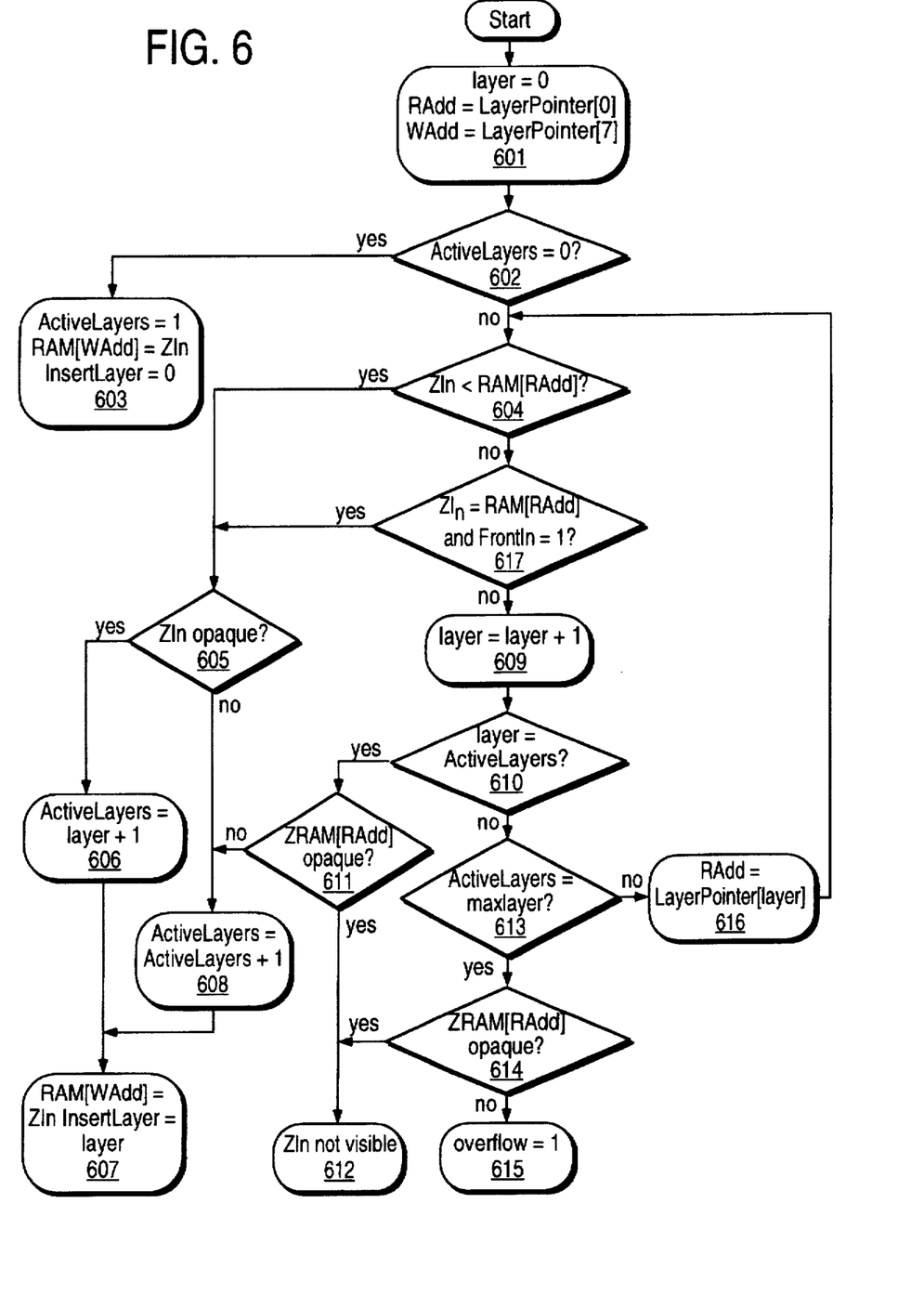
FIG. 6 is a flowchart showing the operations performed during the Z-sort.

FIG. 6 is a flowchart showing the operations performed during the Z-sort, wherein the contents for the ActiveLayers and LayerPointer registers are calculated. In the first operation, step 601, the LayerCounter is initialized to 0; the RAM read address (RAdd) is initialized to LayerPointer [0]; and the RAM write address (WAdd) is initialized to LayerPointer [7]. A determination is then made as to whether the ActiveLayers register is 0, step 602. If so, the ActiveLayers register is incremented to 1; the InsertLayer is set to 0; and ZIn is written into the RAM at the write address. If the ActiveLayers register is not 0, the Z values for each of the objects are compared, step 604. If the Z value of the incoming object is closer than the Z value presently associated with layer 0, step 605 is performed. Otherwise, step 617 is executed. In step 617, a determination is made as to whether the Z value of the incoming object is equal to the Z value presently associated with layer 0 and the Front bit is set. If so, step 605 is executed. Otherwise, step 609 is executed.

In step 605, a determination is made as to whether the incoming object is opaque. If the incoming object is opaque, the ActiveLayers register is set to the LayerCounter plus 1, step 606. The InsertLayer is set to the LayerCounter, and ZIn is written into the RAM at the write address, step 607. If it is determined that the incoming object is not opaque, the ActiveLayers register is incremented, step 608. Step 607 wherein the InsertLayer is set to the LayerCounter and the ZIn is written.

In step 609, the LayerCounter is incremented. A determination is made as to whether the LayerCounter is equal to the ActiveLayers, step 610. If they are equal, this signifies that there are no more Z values in the RAM for comparison. In that case, a determination is made as to whether the object in the last layer is opaque, step 611. If the object in the last layer is not opaque, step 608 is executed. Otherwise, ZIn is not visible, and it is discarded, step 612.

If the LayerCounter is not equal to the value in the ActiveLayers register, it becomes necessary to check the Z-buffer to determine whether it is full, step 613. If the ActiveLayers register value is equal to the maximum layer (e.g., 8), this indicates that the Z-buffer is full. A determination is then made as to whether the object in layer 8 is opaque, step 614. If so, then ZIn is discarded, step 612. Otherwise, an overflow condition is asserted, step 615. If, however, the value in the ActiveLayers register is not equal to the maximum layer, ZIn is compared with the other Z values in the RAM. The read address for the next layer is determined by reading the LayerPointer register. ZIn is compared with the Z value read from the RAM using the new read address, step 616. Step 604 is then repeated.

Thus, a computer graphics system having a high performance multiple layer Z-buffer is disclosed.

What is claimed is:

1. In a computer system, a method of maintaining for subsequent display Z-buffered data comprising the steps of:

generating data describing objects for display;

storing said data in a multiple layer Z-buffer, wherein each layer of said Z-buffer corresponds to a relative depth of display of one of said objects, wherein objects having lower Z-values are in front of objects having higher Z-values;

storing a plurality of pointers in a first register, each pointer corresponding to a layer and specifying an address where data corresponding to the layer is stored; and determining an insert layer where data of an incoming object is to be inserted, said input layer determined dependent upon the Z-value of the incoming object, wherein said addresses of the pointers stored in said first register are selectively updated to reflect insertion of said data of said incoming object;

storing a number indicating how many of said layers contain visible data in a second register according to a Z value and an opaqueness of said incoming object relative to Z values and opaqueness of objects already stored in said Z-buffer.

2. The method of claim 1, wherein said incoming object has an opaqueness and a Z-value, and wherein said insert layer is determined according to said opaqueness and said Z-value in relation with Z values and opaqueness of objects already stored in said Z-buffer.

3. The method of claim 1 wherein said data of said incoming object is stored at a location specified by an address corresponding to a last one of said plurality of layers, and a set of said addresses of said first register are shifted right, said set comprising an address of data corresponding to said insert layer and addresses of the pointers corresponding to all layers following said insert layer.

4. The method of claim 3 further comprising the steps of shifting said set of pointers using a first set of multiplexers coupled to said first register; and writing said address of the pointer of the last layer to the pointer of said insert layer by utilizing a second set of multiplexers.

5. The method of claim 1 further comprising the step of determining whether a backmost object is opaque, wherein if said backmost object is opaque and said data corresponding to said incoming object has a greater Z value than that of said backmost object then said data of said incoming object is not written to said Z-buffer.

6. The computer system of claim 1 further comprising a means for determining whether said incoming object is opaque and whether said incoming object is in front of any of said objects already stored in said Z-buffer, wherein if said incoming object is opaque, any of said objects already stored in said Z-buffer are identified as no longer being needed.

7. The method of claim 1, wherein said Z-buffer stores a a portion of an entire image to be displayed.

8. The method of claim 1, wherein said Z-buffer comprises a scanline Z-buffer.

9. The method of claim 1, wherein said data of said incoming object includes a signal indicating whether said incoming object is frontfacing.

10. The method of claim 1 further comprising the step of detecting an overflow condition, wherein all of said layers contain visible objects and data of said incoming object is received, said overflow condition occurs when all of said plurality of layers contain visible objects and data of said incoming object is received and said incoming object is visible.

11. The method of claim 1, wherein said Z-buffer comprises eight layers.

12. A computer system comprising:

a processor for generating data corresponding to a plurality of objects for display;

a Z-buffer, being coupled to said processor, for storing said data in a plurality of memory locations, said Z-buffer supporting a plurality of layers, each layer of said plurality of layers corresponding to a relative display depth;

a first memory, being coupled to said Z-buffer, for storing a plurality of pointers, each pointer comprising an address corresponding to a memory location of said plurality of memory locations;

a circuit, being coupled to said first memory, for determining into which layer of said plurality of layers an object of a plurality of objects is to be inserted, each object of said plurality of objects being associated with a Z-value, an insertion of said object causing a selective update of the addresses of the pointers to indicate that said object is in front of a second object if said second object has a Z-value greater than said first object; and a second memory for storing a number indicating how many of said layers contain visible data in said Z-buffer, said visible data corresponding to a frontmost opaque object in said Z-buffer and to non-opaque objects in said Z-buffer that are in front of said frontmost opaque object.

13. The computer system of claim 12 wherein said first memory includes a shift register, each address of said plurality of pointers corresponds to a predetermined number of bits, wherein said plurality of addresses are stored contiguously in said shift register.

14. The computer system of claim 13, wherein said circuit is for assigning a first object received from said processor to an insert layer, said insert layer being determined by a Z-value corresponding to said first object, and said insert layer corresponding to a last layer of said plurality of layers, said shift register is for shifting a set of addresses of said plurality of addresses to the right, said set of addresses comprising an address corresponding to the pointer of the insert layer and addresses corresponding to the pointers of the layers following said insert layer.

15. The computer system of claim 12 further comprising a means for determining whether an incoming object is opaque and whether said incoming object is in front of any of said plurality of objects already stored in said Z-buffer, wherein if said incoming object is opaque, any of said plurality objects that are behind said incoming object already stored in said Z-buffer do not effect said pixel data.

16. The computer system of claim 12 further comprising a means for determining whether a backmost object is opaque, wherein if said backmost object is opaque and said data corresponding to said incoming object has a greater Z value than that of said backmost object, said data of said incoming object is not written to said Z-buffer.

17. The computer system of claim 12, further comprising a frame buffer, being coupled to said Z-buffer, for storing pixel data corresponding to data stored in said Z-buffer, and a display, being coupled to said frame buffer, and having an input for receiving said pixel data, wherein said Z-buffer stores a portion of an entire image that is to be displayed.

18. The computer system of claim 12, further comprising a frame buffer, being coupled to said Z-buffer, for storing pixel data corresponding to data stored in said Z-buffer, and a display, being coupled to said frame buffer, and having an input for receiving said pixel data, wherein said Z-buffer comprises a scanline buffer.

19. The computer system of claim 12, wherein said data of said incoming object includes a signal indicating whether said incoming object is frontfacing.

20. The computer system of claim 12 further comprising an overflow circuit for detecting and indicating an overflow condition in said Z-buffer, said overflow condition occurring when all of said plurality of layers contain visible objects and data of an incoming object is received and said incoming object is visible.

21. The computer system of claim 12, wherein said Z-buffer supports eight layers.

* * * * *